(12) United States Patent
Quintero

(10) Patent No.: US 7,322,149 B1
(45) Date of Patent: Jan. 29, 2008

(54) LOCKING MECHANISM FOR FISHING ROD AND REEL

(76) Inventor: Miguel Quintero, 110 Fordham, San Antonio, TX (US) 78228

( * ) Notice: Subject to any disclaimer, the term of this patent is extended or adjusted under 35 U.S.C. 154(b) by 234 days.

(21) Appl. No.: 11/200,622

(22) Filed: Aug. 10, 2005

(51) Int. Cl.
*A01K 97/08* (2006.01)

(52) U.S. Cl. ............ 43/26; 206/315.11; 224/922

(58) Field of Classification Search ............ 43/26, 43/54.1; 206/315.11; 224/922; 211/70.8
See application file for complete search history.

(56) References Cited

U.S. PATENT DOCUMENTS

| | | | | |
|---|---|---|---|---|
| 908,903 A * | 1/1909 | Thornton | | 43/26 |
| 1,342,517 A * | 6/1920 | Tyson | | 211/68 |
| 2,501,270 A * | 3/1950 | Fleming | | 43/26 |
| 2,555,073 A * | 5/1951 | Zdankoski | | 43/54.1 |
| 2,641,520 A * | 6/1953 | Moore | | 43/54.1 |
| 2,899,103 A * | 8/1959 | Ebert | | 43/54.1 |
| 3,204,362 A * | 9/1965 | Andrews | | 43/26 |
| 3,349,512 A * | 10/1967 | Walker | | 43/26 |
| 3,376,614 A * | 4/1968 | Stahl, Jr. | | 211/70.8 |
| 3,399,939 A * | 9/1968 | Anderson | | 206/315.11 |
| 3,490,169 A * | 1/1970 | Tweed | | 206/315.11 |
| 3,524,572 A * | 8/1970 | Hall | | 211/70.8 |
| 3,635,433 A * | 1/1972 | Anderson | | 211/70.8 |
| 3,662,933 A * | 5/1972 | Michal | | 43/26 |
| 3,876,076 A * | 4/1975 | Hazelhurst | | 211/70.8 |
| 4,027,798 A * | 6/1977 | Swaim | | 211/70.8 |
| 4,063,646 A * | 12/1977 | Stahl, Jr. | | 211/70.8 |
| 4,170,801 A * | 10/1979 | Ward | | 43/26 |
| 4,306,601 A * | 12/1981 | Wallis et al. | | 43/26 |
| 4,335,840 A * | 6/1982 | Williams | | 224/922 |
| 4,359,161 A * | 11/1982 | Sinoff | | 43/26 |
| 4,378,882 A * | 4/1983 | Miller | | 206/315.11 |
| 4,523,704 A * | 6/1985 | Washington | | 43/26 |
| 4,529,112 A * | 7/1985 | Miller | | 224/922 |
| 4,555,862 A * | 12/1985 | Panasewich | | 43/54.1 |
| 4,770,327 A * | 9/1988 | Fortson | | 43/54.1 |
| 4,827,658 A * | 5/1989 | Wolniak | | 43/54.1 |
| 4,841,660 A * | 6/1989 | James | | 43/54.1 |
| 4,858,366 A * | 8/1989 | Rushton | | 43/26 |
| 4,953,318 A * | 9/1990 | Vasseur, Jr. | | 224/922 |
| 4,974,537 A * | 12/1990 | Martin | | 224/922 |
| 5,046,279 A * | 9/1991 | Smith et al. | | 43/26 |
| 5,310,103 A * | 5/1994 | Weber et al. | | 224/922 |
| 5,319,874 A * | 6/1994 | Vance | | 43/26 |
| 5,331,761 A * | 7/1994 | Kuthy | | 43/54.1 |
| 5,347,746 A * | 9/1994 | Letson | | 206/315.11 |
| 5,361,611 A * | 11/1994 | Hisler | | 224/922 |
| 5,425,194 A * | 6/1995 | Miller | | 43/26 |
| D360,455 S * | 7/1995 | Dentsbier | | D22/147 |
| 5,435,473 A * | 7/1995 | Larkum | | 224/922 |
| 5,460,306 A * | 10/1995 | Rudd | | 224/922 |
| 5,560,138 A * | 10/1996 | Dentsbier | | 211/70.8 |
| 5,588,542 A * | 12/1996 | Winkler et al. | | 211/70.8 |
| 5,632,427 A * | 5/1997 | Gattuso et al. | | 224/922 |
| 5,692,335 A * | 12/1997 | Magnuson | | 43/54.1 |
| 5,975,393 A * | 11/1999 | Bellamy | | 43/26 |
| 6,003,748 A * | 12/1999 | Rivenbark | | 224/922 |

(Continued)

FOREIGN PATENT DOCUMENTS

JP 11-75653 A * 3/1999

*Primary Examiner*—Darren W. Ark
(74) *Attorney, Agent, or Firm*—Lawrence J. Gibney, Jr.

(57) ABSTRACT

This is a device to hold multiple fishing rods and reels for the purpose of fishing or storage.

5 Claims, 4 Drawing Sheets

U.S. PATENT DOCUMENTS

| | | | |
|---|---|---|---|
| 6,119,858 A * | 9/2000 | Davidson | 206/315.11 |
| 6,283,288 B1 * | 9/2001 | Rich | 43/54.1 |
| 6,510,953 B2 * | 1/2003 | Daniels | 211/70.8 |
| 6,530,170 B1 * | 3/2003 | Sweeney | 211/70.8 |
| 6,742,789 B1 * | 6/2004 | Nowak | 43/54.1 |
| 6,865,841 B2 * | 3/2005 | Wieringa | 43/26 |
| 6,910,592 B1 * | 6/2005 | Lindenmeyer | 211/70.8 |
| 6,932,224 B1 * | 8/2005 | Sandberg | 211/70.8 |
| 7,219,464 B1 * | 5/2007 | Kujawa | 224/922 |
| 2002/0020644 A1 * | 2/2002 | Belanger | 206/315.11 |
| 2005/0126063 A1 * | 6/2005 | Bowerman | 43/21.2 |
| 2006/0070292 A1 * | 4/2006 | Fitzgerald | 43/26 |

\* cited by examiner

LOCKING MECHANISM FOR FISHING ROD AND REEL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

Fishing has been around for years. One of the difficulties with fishing is that an individual can only handle one rod and reel at a time. This device will allow an individual to place bait in the water at different locations and have access to more than one reel at the same time.

B. Prior Art

There are multiple prior art references related to the sport of fishing. There are also other fishing rod holders including Stahl, U.S. Pat. No. 3,376,614 which serves to lock in place several rods and reels. Other examples of this type of prior art include Dentsbier, U.S. Pat. No. 5,560,138 and Winkler, U.S. Pat. No. 5,588,542.

One of the objects of the current invention is to make the rods and reels accessible and easily removable yet secured in place in the event that a fish is hooked.

Another object is to place the rod and reel in a secure position so that if the fish were to grab the bait they could not pull the rod and reel from this particular device and into the water.

BRIEF SUMMARY OF THE INVENTION

This is a device to secure a plurality of rods and reels in a casing. The casing has four sidewalls, a top surface and a bottom surface. It has the general shape of a rectangular box with two long sides and two short sides. A means of attachment such as a clamp is provided on one of the long sides. This means of attachment is used to secure the device to the side edge of a boat.

On one of the long sides is a cover such as mesh or grating. In normal operation with the device in the "closed" position, the mesh would cover the rod portion of the rod and reel.

The side that contains the mesh or grating is attached at one end with a means of attachment. This means of attachment for the side with the grating is placed on one corner surface and allows the device to open and close to insert or remove a rod and reel from the device. This means of attachment will remain in place during normal operation.

On the opposite end of the means of attachment for the side with the grating is a means to close and secure the device. This can be accomplished with a through hole and locking pin as an example. Other means may also be employed to accomplish that same result.

On the top and bottom surfaces indentations have been provided so that when the device is closed a hole is formed in the top surface and the bottom surface. The indentations are designed to be circular and allow the rod and handle of the rod and reel through the respective openings but prevent the reel portion from passing through the opening on the bottom or top formed by the indentations. The rod is placed or secured through these holes.

The device can be closed to secure the rods and reels and is locked with a pin, for example. In the event that a fish takes the bait, the fish could not pull the rod through the device and into the water.

DETAILED DESCRIPTION OF THE EMBODIMENTS

Figure 1:
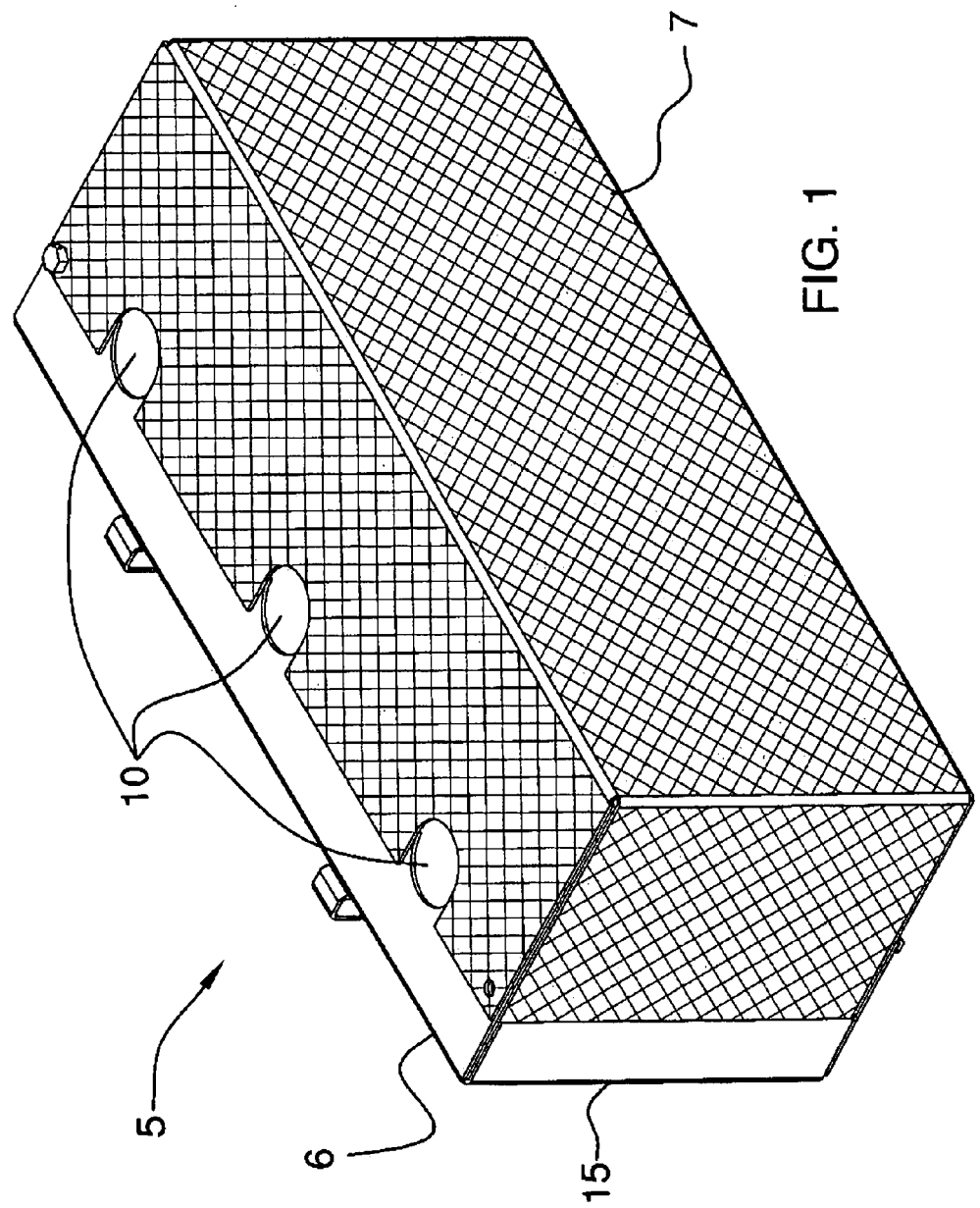
FIG. 1 is a perspective view of the device from the front.

The device 5 is a rectangular box comprising two halves 6, 7, which has two long sides, two short sides, a top surface, a bottom surface and four walls that provide a predetermined structure for the device. FIG. 1,2 The long sides have identical dimensions and the two short sides have identical dimensions.

Figure 2:
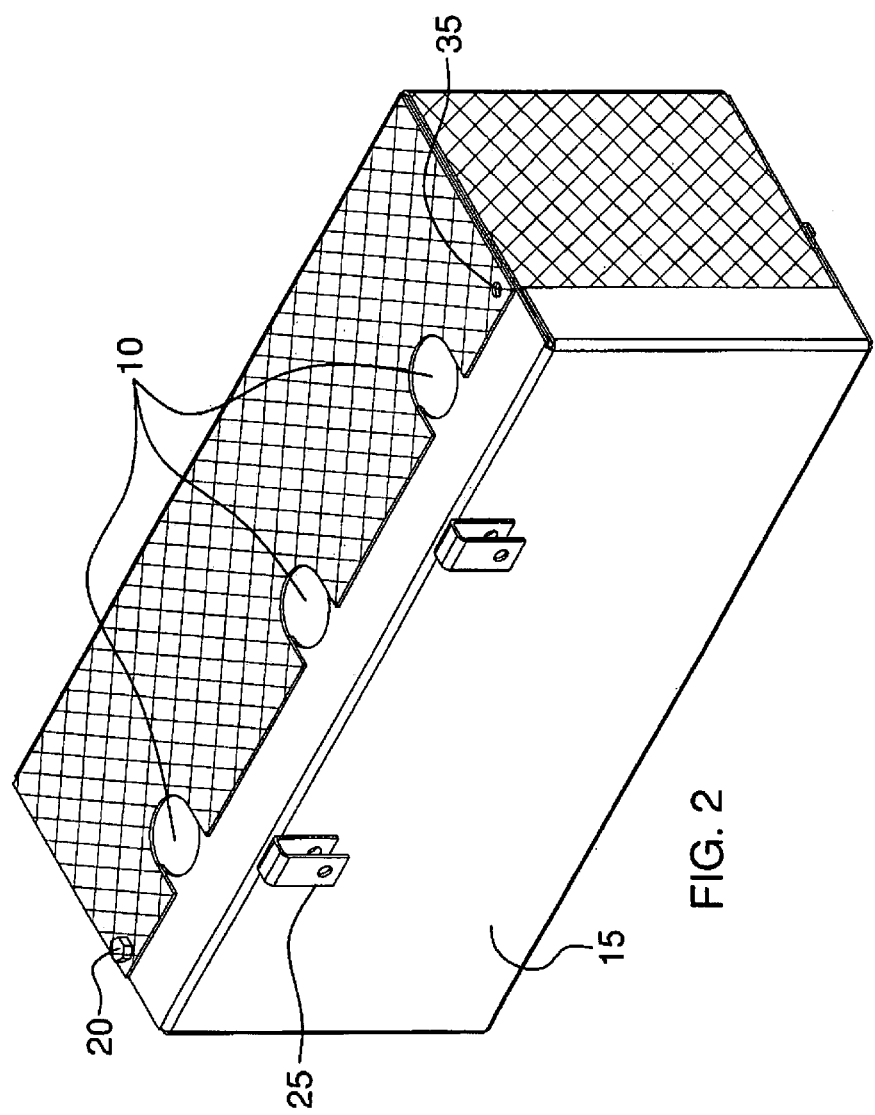
FIG. 2 is a perspective view of the device from the back.

One of the long sides 15 is provided with a means to attach the device to a boat. Clamps 25 or another method may be used to attach this device to the side of a boat. The side 15 with the clamps 25 remains fixed in position when the device 5 is used. FIG. 2

Figure 3:
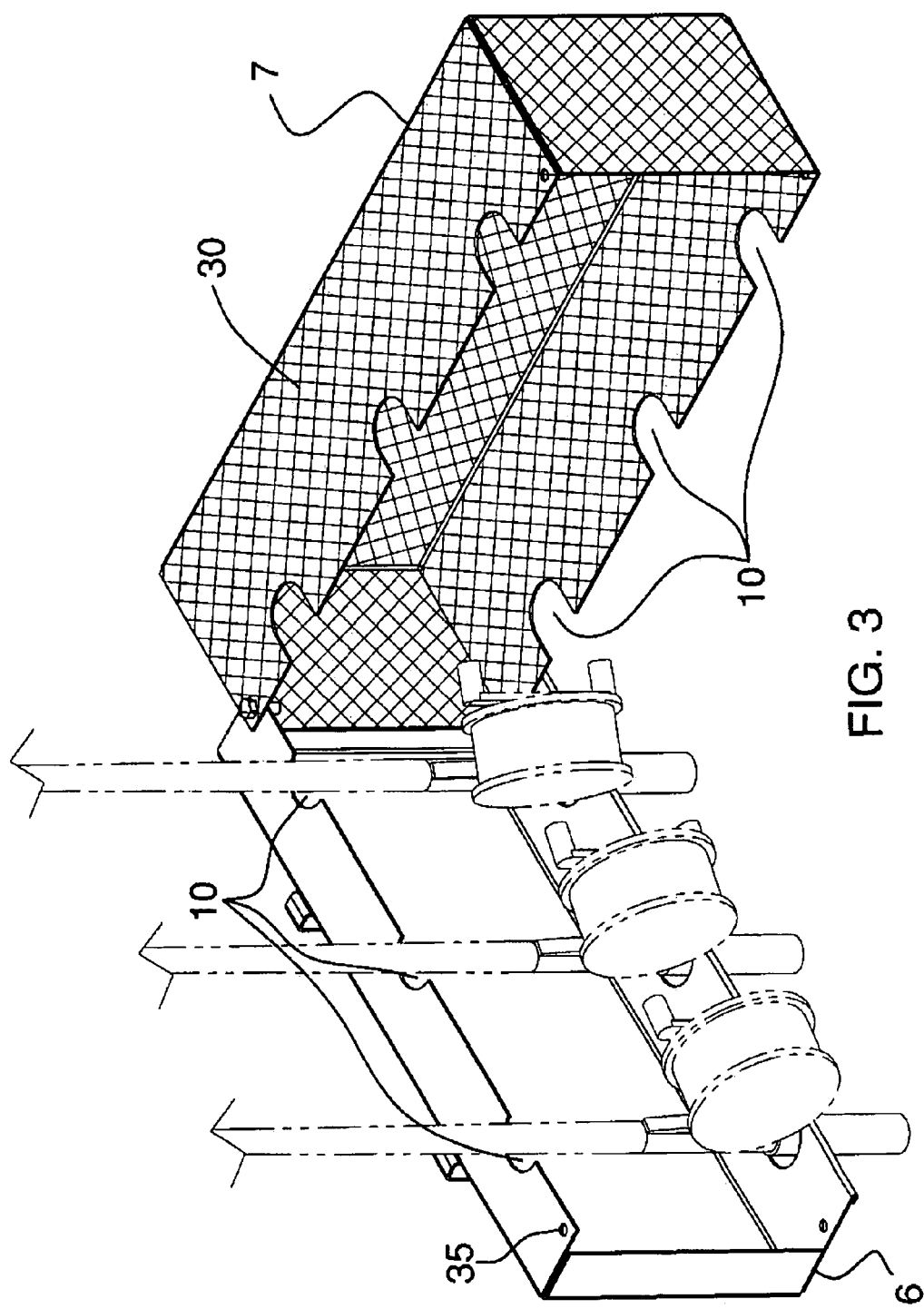
FIG. 3 is an in use view of the device in the "open" position.

On the opposite side from the long fixed side 15 is a side with identical dimensions that can "open" and "close" when the device is used. FIG. 3,4 A covering 30 such as mesh or grating is provided on this surface.

A means to connect the box together is provided and is depicted as a hinge bolt 20 on one end, which allows the mesh cover 30 to rotate around the hinge bolt 20 so that it may be open and closed. The hinge bolt 20 connects both sides of the device from top to bottom and may be a solid piece such as a cotter pin or a nut and bolt assembly. The hinge bolt 20 defines an axis of the hinge which is perpendicular to a longitudinal axis of the rectangular box 5.

There are a plurality of arch-shaped cutout portions 10 on this device, which will allow the pole, rod and reel to be inserted through the bottom cutout portion and the top cutout portion. This is accomplished by providing a cutout on the top surface and a cutout on the bottom surface to accommodate a rod and reel when the device is used.

These cut out portions on the top surface and the bottom surface form a circle 10 around the handle of the rod and reel and the pole portion of the rod and reel when the device is "closed". FIG. 2,4 The hole 10 which is formed in the bottom surface in the mesh will allow the handle of the rod and reel to be inserted through the bottom cutout portion. FIG. 3

In operation the surface with the mesh cover is closed to encase the rod and reels by engaging the half of the rectangular box 7 with the covering 30 with the other half of the rectangular box 6 and is secured with a locking device, which is inserted through the locking hole 35 from top to bottom such that an axis of the means to secure the device extends parallel to the axis of the hinge. This locking device may be a cotter pin or nut and bolt assembly among others The locking hole 35 comprises at least one hole in each of the two halves 6, 7 of the rectangular box which extend perpendicular to the longitudinal axis of the rectangular box and can be aligned with each other when the device is closed.

The clamps 25 on the fixed portion 15 would allow the device to be clamped to the side of a boat. Although a specific type of clamp is drawn, another means of connection may be used.

Figure 4:
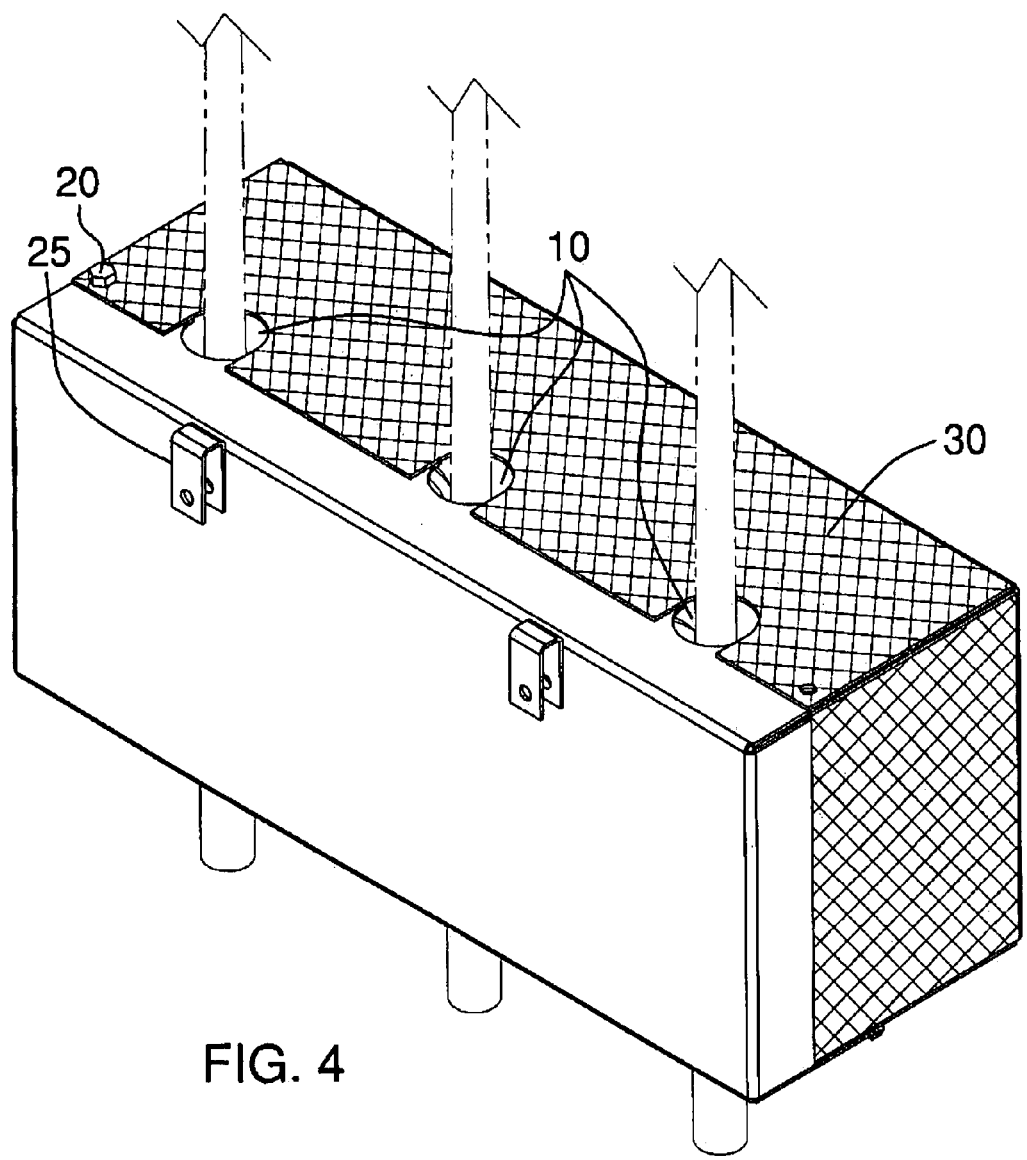
FIG. 4 is a view of the device in the "closed" position.

In normal operation on a boat the rod and reel are placed in the interior of the device and the device is then closed and secured with a locking pin through the locking hole 35. FIG. 4 The clamps 25 secure the device 5 to the side of the vessel as the vessel moves.

If an individual rod and reel is needed, the locking device is removed from the locking hole 35 and the device is opened by rotating around the hinge 20. FIG. 3 This allows the device to rotate and open to allow a rod to be taken from this device 5 and then the device 5 can be closed again.

The invention claimed is:

1. A device to house a plurality of fishing rods and reels on a boat, which is comprised of:
    a. a rectangular box comprising two halves;
    wherein the rectangular box has two long sides, two short sides, and two sides of predetermined length to give the device depth;
    wherein the two long sides have identical dimensions and are located opposite of each other on a respective half of the two halves of the rectangular box;
    wherein the two short sides have identical dimensions;
    b. means to connect to a side of a boat;
    c. a covering;
    d. at least one locking hole;
    e. means to secure the device for insertion into the at least one locking hole;
    f. arch-shaped cutout portions;
    g. a hinge comprising a hinge bolt defining an axis of the hinge that extends perpendicular to a longitudinal axis of the rectangular box;
    wherein one half of the two halves of the rectangular box with one of the two long sides is equipped with the means to connect to a side of a boat;
    wherein the other half of the two halves of the rectangular box with the other of the two long sides has the covering thereon;
    wherein the hinge connects the two halves of the rectangular box to each other so as to allow the device to open and close;
    wherein the device can be opened and closed by rotating the other half of the two halves of the rectangular box with the other of the two long sides with the covering around the axis of the hinge;
    wherein the arch-shaped cutout portions are placed both on edges of the one half of the two halves of the rectangular box which define portions of the two sides of predetermined length and on edges of the other of the two halves of the rectangular box which define portions of the two sides of predetermined length;
    wherein, when the device is closed by rotating the other half of the two halves of the rectangular box toward and into engagement with the one half of the two halves of the rectangular box, the arch-shaped openings on the edges of the one half of the two halves of the rectangular box are brought in close proximity to the arch-shaped openings on the edges of the other half of the two halves of the rectangular box so as to form aligned circular openings for receiving fishing rods and reels therethrough;
    wherein the at least one locking hole comprises at least one hole in each of the two halves of the rectangular box which extend perpendicular to the longitudinal axis of the rectangular box, the at least one hole in the one half of the two halves of the rectangular box can be aligned with the at least one hole in the other half of the two halves of the rectangular box when the device is closed by engaging the two halves of the rectangular box;
    wherein the device can be locked closed by inserting the means to secure the device into the at least one holes of the two halves of the rectangular box when they are aligned such that an axis of the means to secure the device extends parallel to the axis of the hinge.

2. The device as described in claim 1 wherein the covering is mesh.

3. The device as described in claim 1 wherein the covering is grating.

4. The device as described in claim 1 wherein the means to connect to a side of a boat is a plurality of clamps.

5. The device as described in claim 1 wherein the means to secure the device is a locking pin.

* * * * *